US007861101B2

(12) United States Patent
Houshaku

(10) Patent No.: US 7,861,101 B2
(45) Date of Patent: Dec. 28, 2010

(54) RECONFIGURABLE SIGNAL PROCESSOR

(75) Inventor: Masahiro Houshaku, Kanagawa (JP)

(73) Assignee: Panasonic Corporation, Osaka (JP)

( * ) Notice: Subject to any disclaimer, the term of this patent is extended or adjusted under 35 U.S.C. 154(b) by 806 days.

(21) Appl. No.: 11/792,562

(22) PCT Filed: Nov. 24, 2005

(86) PCT No.: PCT/JP2005/021575

§ 371 (c)(1),
(2), (4) Date: Jun. 7, 2007

(87) PCT Pub. No.: WO2006/061996

PCT Pub. Date: Jun. 15, 2006

(65) Prior Publication Data

US 2008/0034235 A1 Feb. 7, 2008

(30) Foreign Application Priority Data

Dec. 7, 2004 (JP) ............................. 2004-354385

(51) Int. Cl.
*G06F 1/00* (2006.01)
*G06F 1/32* (2006.01)
(52) U.S. Cl. ................... 713/300; 713/320; 713/323; 713/324; 713/330; 712/15
(58) Field of Classification Search ................ 713/300, 713/310, 320, 323, 324, 330; 712/15
See application file for complete search history.

(56) References Cited

U.S. PATENT DOCUMENTS 5,655,069 A     8/1997   Ogawara et al.

(Continued)

FOREIGN PATENT DOCUMENTS

EP      1 310 881 A    5/2003

(Continued)

OTHER PUBLICATIONS

Gayasen et al., "A Dual VDD Low Power FPGA Architecture," Field-Programmable Logic and Applications. 14th International Conference, FPL 2004. Proceedings (Lecture notes in Comput. Sci. vol. 3203) Springer-Verlag Berlin, Germany, Sep. 1, 2004, pp. 145-157.

(Continued)

*Primary Examiner*—Thomas Lee
*Assistant Examiner*—Michael J Brown
(74) *Attorney, Agent, or Firm*—McDermott Will & Emery LLP

(57) ABSTRACT

A reduction in circuit size and in power consumption is provided. A signal processor includes: processor elements 501, which are mapped by circuit reconfiguration; processor elements 502a and 502b, which are not mapped by circuit reconfiguration; a power voltage supply area 503; a power voltage cutoff area 504; a system control CPU 505; a configuration information storage memory 506; a configuration control signal decoder 507; a configuration control circuit 508; a configuration control circuit 509 for a power supply unit; a data memory 510; a global bus (high voltage side) 511; and a global bus switch (high voltage side) 512. The signal processor includes a function for circuit reconfiguration of the individual processor elements 501 in consonance with the contents of a signal process to be performed and a function for changing a voltage to be supplied to the processor elements 501.

1 Claim, 15 Drawing Sheets

U.S. PATENT DOCUMENTS

| | | | |
|---|---|---|---|
| 6,141,762 | A | 10/2000 | Nicol et al. |
| 6,768,337 | B2* | 7/2004 | Kohno et al. ............... 326/41 |
| 6,986,021 | B2* | 1/2006 | Master et al. ............... 712/15 |
| 7,100,056 | B2* | 8/2006 | Barr et al. ............... 713/300 |
| 7,646,216 | B2* | 1/2010 | Shiao et al. ............... 326/38 |
| 2003/0184339 | A1 | 10/2003 | Ikeda et al. |
| 2004/0030942 | A1 | 2/2004 | Barr et al. |
| 2004/0093529 | A1* | 5/2004 | Devlin et al. ............... 713/300 |

FOREIGN PATENT DOCUMENTS

| | | |
|---|---|---|
| EP | 1 391 991 A | 2/2004 |
| JP | 8-44581 A | 2/1996 |
| JP | 2000-66776 A | 3/2000 |
| JP | 2001-68993 A | 3/2001 |
| JP | 2004-78940 A | 3/2004 |
| WO | WO 02/095946 A1 | 11/2002 |

OTHER PUBLICATIONS

Chong et al., "Low-Power Field-Programmable VLSI Processor Using Dynamic Circuits," VLSI, 2004. Proceedings. IEEE Computer Society Annual Symposium on Lafayette, LA, USA Feb. 19-20, 2004, Los Alamitos, CA, USA, IEEE Comput. Soc. US, Feb. 19, 2004, pp. 243-248.

Anderson et al., "A Novel Low-Power FPGA Routing Switch," Custom Integrated Circuits Conference, 2004. Proceedings of the IEEE 2004, IEEE, Piscataway, NJ, US, Oct. 3, 2004, pp. 719-722.

Chen et al., "Low-Power Technology Mapping for FPGA Architectures with Dual Supply Voltages," FPGA 2004. ACM/SIGDA 12th. ACM International Symposium on Field-Programmable Gate Arrays. Monterey, CA. Feb. 22-24, 2004; [ACM/SIGDA International Symposium on Field-Programmable Gate Arrays], New York, NY, ACM, US, Feb. 22, 2004, pp. 109-117.

Trimberger et al., "A Time-Multiplexed FPGA," Field-Programmable Custom Computing Machines, 1007. Proceedings. The 5th Annual IEEE Symposium on Napa Valley, CA, USA Apr. 16-18, 1997, Los Alamitos, CA, USA, IEEE Comput. Soc. US, Apr. 16, 1997, pp. 22-28.

Amano et al., "Techniques for Virtual Hardware on a Dynamically Reconfigurable Processor—An Approach to Tough Cases," Lecture Notes in Computer Science, Springer Verlag, Berlin; DE, vol. 3203, Aug. 30, 2004, pp. 464-473.

Extended European Search Report issued in European Patent Application No. EP 05809483 dated Apr. 1, 2009.

* cited by examiner

US 7,861,101 B2

RECONFIGURABLE SIGNAL PROCESSOR

RELATED APPLICATIONS

This application is the U.S. National Phase under 35 U.S.C. §371 of International Application No. PCT/JP2005/021575, filed on Nov. 24, 2005, which in turn claims the benefit of Japanese Application No. 2004-354385, filed on Dec. 7, 2004, the disclosures of which Applications are incorporated by reference herein.

TECHNICAL FIELD

The present invention relates to a reconfigurable signal processor.

BACKGROUND ART

In recent years, an all-inclusive system LSI, a System On Chip (SoC), for the mounting of multiple circuits, for performing various signal processes, has been requested. However, it is extremely rare for a SoC that all the circuits or functions integrated on a system LSI will be operated at the same time, and usually, only a few % to 40% of the total circuits are operated. Further, when the individual circuit blocks that are mounted are broken down into groups having specific sizes, in almost all cases, similar signal processes or computing operations are repetitively performed. As means for reducing dimensions and power consumption in such a case, a dynamic reconfigurable processor (hereinafter abbreviated as a DRP) has been proposed.

In a DRP, a plurality of computing units are arranged in a matrix pattern, and the DRP includes a function for re-establishing (configuring) the connections (circuit structure) of the computing units within one clock cycle. As a result, with small circuit resources, changing to various signal processing circuits is enabled, so that reduced circuit dimensions and a power use reduction are provided.

FIG. 13 is an explanatory diagram for a conventional reconfigurable processor, showing a processor element 1301, a system control CPU 1305, a configuration information storage memory 1306, a configuration control circuit 1308, a data memory 1310, a bus 1311 and a switch unit 1312.

Also, FIG. 14 is an explanatory diagram, for a bus and switch unit in a conventional example when a power reconfiguration function is not included, in which are shown a bus 1401, a switch unit 1402, a configuration information storage memory 1403, a configuration information decoder 1404, a configuration control circuit 1405, an input register 1406 and a processor element (computing unit) 1407.

DISCLOSURE OF THE INVENTION

Problems that the Invention is to Solve

Since a conventional DRP reconfigures a circuit within one machine circle, the switching circuit of the signal processing section is complicated, and this increases the size of the circuit. Further, there is a case wherein very many computing resources (computing units) are arranged in a matrix pattern in order to perform various signal processes; however, many applications are also present for which a large part of the computing resources are not employed, except for a special signal process. Further, the number of signals to be processed (MIPS (Million Instructions Per Second)), which is required for signal processing, can not be uniquely determined, and must be designated using a maximum value that is assumed for signal processing. As a result, overhead due to an increase in the circuit scale becomes a problem.

One objective of the present invention is to provide a signal processor that can reduce the circuit scale and the power to be consumed.

Another objective of the present invention is to provide a signal processor wherein a processor element and the connector thereof can, after reconfiguration, be easily tested.

Means for Solving the Problems

For a signal processor according to the present invention, a level shifter is arranged at means for performing configuration and at the I/F unit of a computing unit, and a configuration control circuit is operated at a high power voltage while the computing unit is operated at a low power voltage, so that the circuit size of a switching circuit is reduced.

Further, since the power voltage of the computing unit is dynamically changed in consonance with an MIPS amount, a transistor size that satisfies the maximum processing speed specification is provided at the design stage to eliminate elements that increase circuit size.

In addition, since a power voltage is a standby voltage or since the state is set to the power OFF state for a computing unit that is not used, depending on the application, OFF leak reduction is enabled. Moreover, to perform power control for the computing unit, the associated configuration is performed in accordance with an instruction received from a configuration information storage memory.

Furthermore, since registers are arranged before and after the computing unit, and a mode is provided for supplying a clock to alternately operate the front and rear registers, the mapping of computing resources in a time sharing manner is enabled.

Further, since a small control circuit is arranged inside the computing unit, and this circuit includes a function that can perform a bit width extension, a multi-operation (e.g., double additions) or a loop execution, and since configuration is also to be performed for a minimum/local reduction in the control scale covered by the configuration, a control circuit for the entire system is provided.

In addition, a function for employing a test mode signal to change an input register to a linear feedback register is provided so as to enable the performance of a self-test.

Moreover, the signal processor of the present invention has a circuit configuration wherein a level shifter is arranged at the input/output I/F of a computing unit (processor element), and the power voltage differs in a reconfiguration control circuit, a multiplexer unit (including a bus) and the processor element. Plus, a high power voltage is set for a circuit reconfiguration switching circuit (the multiplexer unit and the bus unit) in order to increase the processing speed, while a low power voltage is set for the processor element in order to reduce the power for the signal processing.

Also, according to the circuit configuration, the power voltage of the processor element can be changed in accordance with the number of signals (MIPS count) processed during the signal processing, for which the circuit reconfiguration has been performed. By using reconfiguration information (software), power control of the processor element is performed by an internal determination circuit and a compiler located outside the chip. Or, after the circuit reconfiguration has been completed, the power voltage for the processor element that is not mapped is cut off.

Further, an input register and an output register are respectively arranged at the input and output portions of the processor element. Since (1) a mode for sequentially performing a signal process following the circuit reconfiguration, and (2) a mode for alternately operating a stage for performing a transfer from the output register to the input register, and a stage for performing a signal process, such as a computing process, are included, the efficiency of the processor element usage is increased.

Furthermore, since the circuit configuration of the processor element is identified in accordance with configuration information, a function for automatically mapping the processor elements in a time sharing manner is provided by the internal determination circuit and the compiler located outside the chip. Further, a function is included whereby the power voltage of a processor element that is not mapped, or that is in a standby state, can be set to a standby voltage (e.g., the lowest voltage at which the contents of the register can be held).

In addition, a function for employing configuration information to perform scheduling for the signal process contents is included. And a circuit configuration is provided such that a portion whereat the same signal process is repeated, a portion whereat multiple computation is to be performed, or a portion whereat the extension of a bit width is to be applied (or a portion whereat double-precision computation is performed) is extracted, and that a loop function, multiple computation (multiplication accumulation, shift addition, ACS computation, division, etc.), or bit extension between neighboring elements can be performed.

Moreover, the circuit structure also includes: a function whereby, when a test mode is set, the input register or the output register can be reconfigured as a linear feedback shift register, and a function whereby the input register or the output register can be reconfigured as a multi-input signature register, so that the self-test of the DRP is enabled.

Effect of the Invention

According to the invention, the improvement of a processing speed for the configuration circuit can be provided without increasing the size of the circuit. Further, the power consumed by the processor element can be lowered, and the operating speed of the processor element need not be designed to exceed the specification. As a result, a reduction in the size of the circuit is enabled.

Furthermore, conventionally, the maximum amount of signal processing is determined in accordance with the speed specification for the processor elements and the number of processor elements arranged in a matrix pattern, while in the present invention, the processing amount can be flexibly increased. In addition, conventionally, since the speed specification for the processor element is fixed, and since a consistent number of processor elements are arranged in the matrix pattern, there is an element that is not used, depending on the signal process to be performed, and the usage efficiency is lowered. However, in the present invention, in a case wherein elements are not used, these elements are divided for parallel processing and the voltage is dropped, so that the power to be consumed can be lowered, and current leakage can be reduced.

Further, since conventionally the speed specification for the processor element is fixed, and since the number of processor elements arranged in a matrix pattern is consistent, the signal processing capability may be insufficient, depending on the signal process to be performed, so that mapping may be disabled. In this invention, however, even in such a case, the time-sharing mapping function can be employed, and if number of signals processed is physically insufficient, this can be resolved along the time axis.

In addition, according to the signal processor of the present invention, not only are processor elements that are mapped based on reconfiguration information spatially allocated, but they are also allocated in a time sharing manner. Thus, the number of elements to be mounted on the system LSI can be reduced. And when this function and the power cutoff function are employed together, low power consumption and a reduction in current leakage can be provided.

Moreover, the circuit sizes of the multiplexer unit and the bus unit are reduced, and the usage efficiency of the processor elements is improved, so that less power is consumed and there is an increase in the number of signals processed. And the cost of a test can be reduced without increasing the circuit size.

DESCRIPTION OF REFERENCE NUMERALS AND SIGNS

Figure 1:
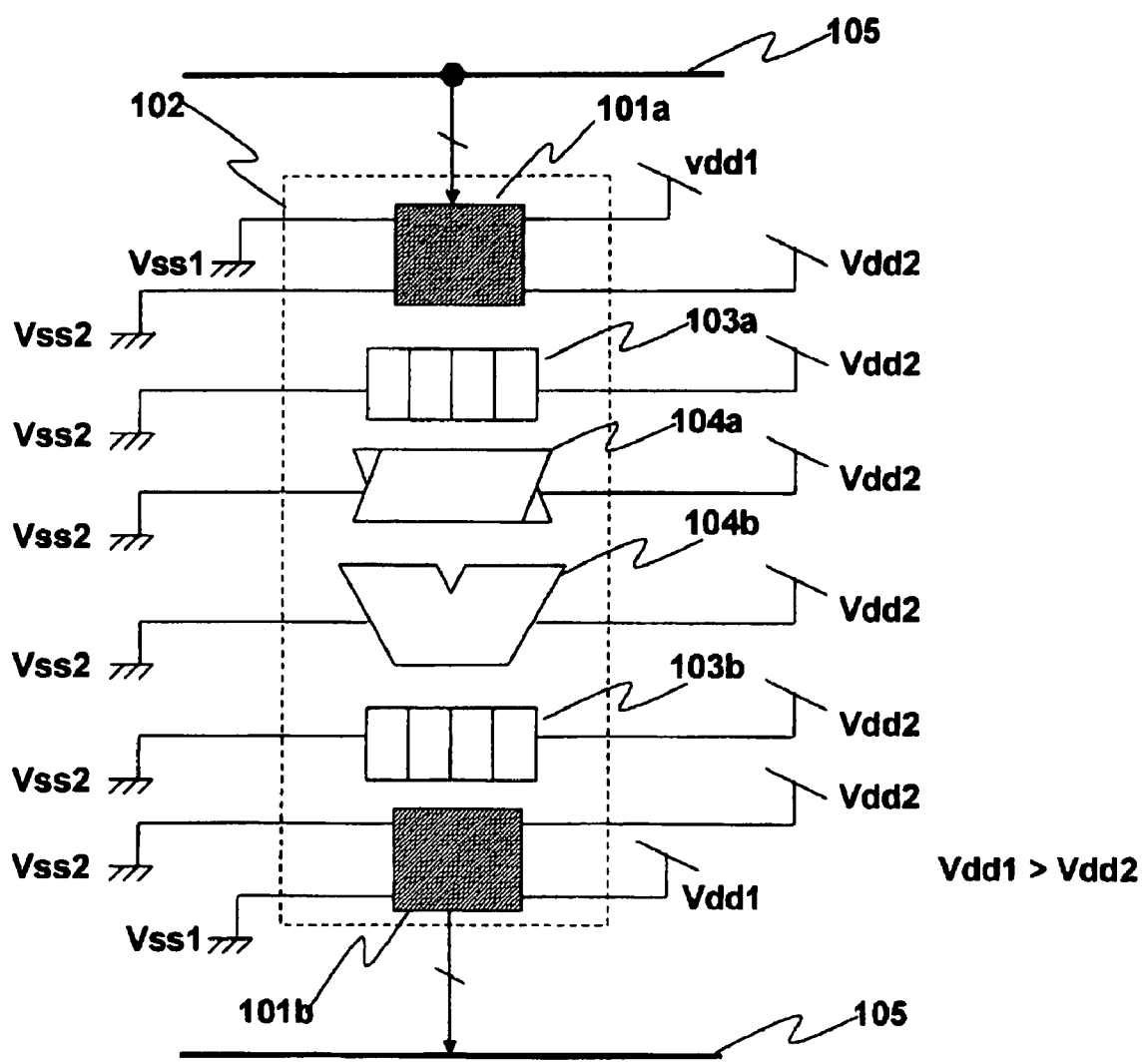
FIG. 1 is a schematic configuration diagram for the processor elements of a signal processor according to a mode of the present invention.

101*a*, 101*b*: level shifter
102, 202, 311, 401: processor element 103a: input register
103b: output register
104a, 204a: computing unit (barrel shifter)
104b, 204b: computing unit (ALU)
105, 205: bus
201a, 201b: level shifter incorporating register
301, 303: power feed line for supplying a low voltage
302: power feed line for supplying a high voltage
304: power IC control signal
305, 410, 509, 609: configuration control circuit of a power supply unit
306: power feed line configuration control signal
307: power voltage variable block
308: power line (vdd1) along which power voltage is dropped further from a low voltage
309: power line (Vdd2) along which power voltage is dropped further from a low voltage
310, 320: level shifter (signal dropping unit)
312, 411: level shifter (signal boosting unit)
409, 507, 607: configuration control signal decoder
501, 601: processor element mapped by circuit reconfiguration
502a, 502b, 602a, 602b: processor element that has still not been mapped through circuit reconfiguration
503, 603: power voltage supply area
504, 604: power voltage cutoff area
505, 605: system control CPU
506, 606: configuration information storage memory
508, 608: configuration control circuit
510, 610: data memory
512, 612: switch
611: global bus
613: local bus

BEST MODE FOR CARRYING OUT THE INVENTION

Figure 2:
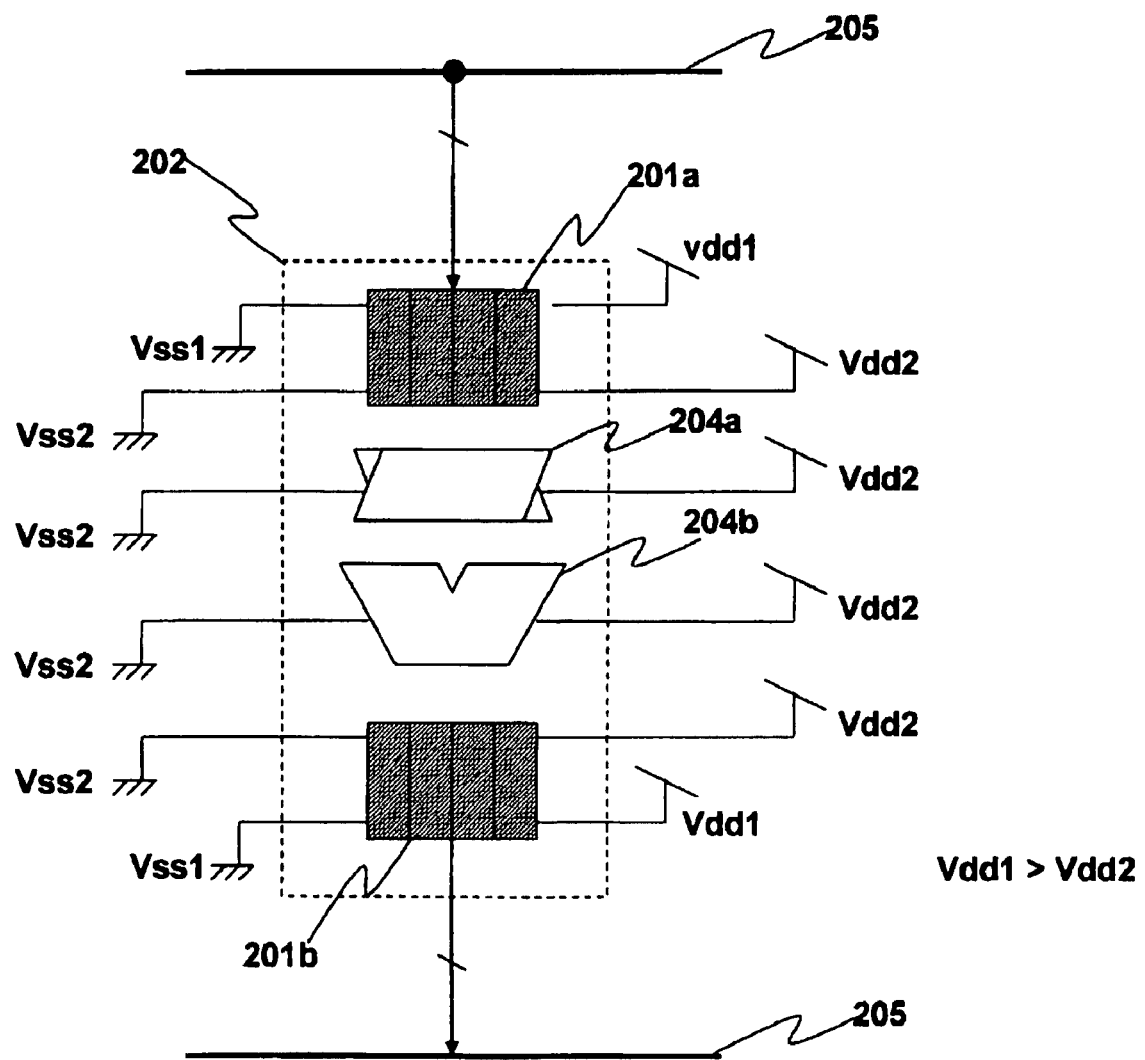
FIG. 2 is a schematic configuration diagram for the processor elements of the signal processor for the mode of the present invention.

FIGS. 1 and 2 are schematic configuration diagrams showing processor elements of a signal processor according to one mode of the present invention. In FIG. 1 are shown level shifters 101a and 101b, a processor element 102, an input register 103a, an output register 103b, a computing unit 104a, such as a barrel shifter, a computing unit 104b, such as an ALU, and a bus 105. In this case, power lines are, for example, at a high power voltage Vdd1=1.5 V and a low power voltage Vdd2=0.8 to 1.3 V.

Further, while referring to FIG. 2, level shifter incorporating registers 201a and 201b, a processor element 202, a computing unit 204a such as a barrel shifter, a computing unit 204b such as an ALU, and a bus 205 are shown. Also in this case, power lines are, for example, at a high power voltage Vdd1=1.5 V and a low power voltage Vdd2=0.8 to 1.3 V.

Figure 3:
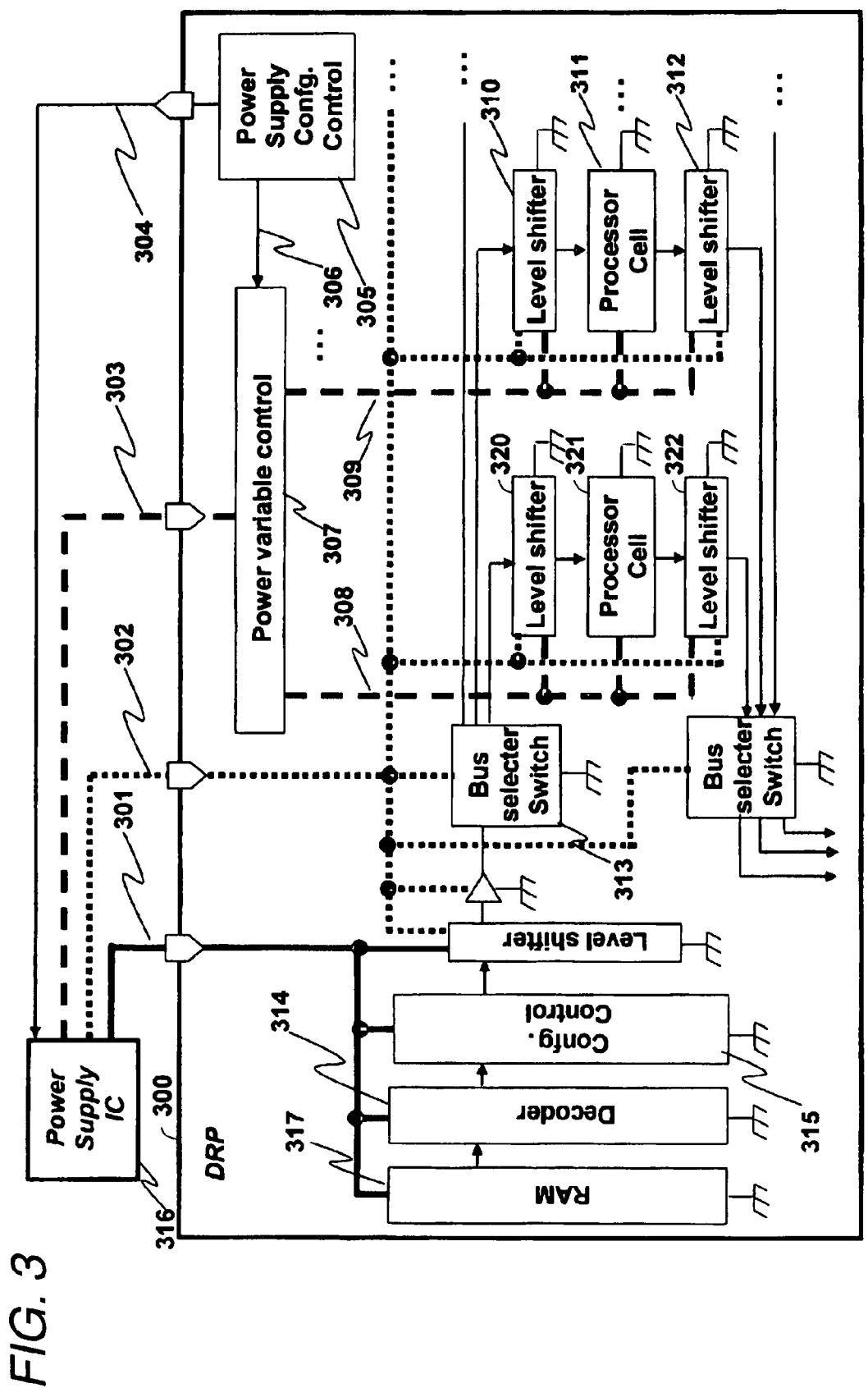
FIG. 3 is an explanatory diagram for power control exercised by the signal processor for the mode of the present invention.

FIG. 3 is an explanatory diagram for power control performed by the signal processor according to the mode of the preset invention. While referring to this diagram, shown are a power feed line 301, for supplying a low voltage; a power feed line 302, for supplying a high voltage; a power feed line 303, for supplying a low voltage; a power IC control signal 304; a configuration control circuit 305 for a power supply unit; a power feed line configuration control signal 306; a power voltage variable block 307; a power line 308 (Vdd1), along which a power voltage has been dropped more from a lower voltage; and a power line 309 (Vdd2), along which a power voltage has been dropped further from a low voltage. In this case, Vdd2≠Vdd1. Furthermore, level shifters (level dropping units) 310 and 320, processor elements 311 and 321 and level shifters (signal boosting units) 312 and 322 are shown.

It should be noted that, although multiple processor elements, etc., are present in the signal processor, only two of them are shown for the explanation.

As shown in FIG. 3, the structure of the signal processor in this mode includes: the processor elements 311 and 321, which are constituted by computing units that perform basic arithmetic operations and logic operations; a bus (not shown) connecting the processor elements 311 and 321; and a switch unit 313, which selects the connection of the processor elements 311 and 321 and employs software to freely change the connection relationship of the processor elements 311 and 321. And a power voltage 302 for the switch unit 313, which selects the connection of the processor elements 311 and 321, a power voltage 303 for the processor elements 311 and 321 and a power voltage 301 for control circuits 314 and 315, which changes the connection relationship of the processor elements 311 and 321, are designated so as to differ from each other. In addition, the level shifters 310, 312, 320 and 322 are located at the input/output I/Fs of the processor elements 311 and 321.

In this case, for example, the power feed line 301 can be at 1.2 V, the power feed line 302 can be at 1.5 V, and the power feed line 303 can be at 0.8 to 1.3 V. Thus, when 1.2 V is supplied as the power voltage 303 by an external power supply IC 316, the incorporated operational amplifier of the power voltage variable block 307 can supply 1.2 V along the power line 308 (Vdd1), and can supply 0.9 V, which is dropped from 1.2 V, along the power line 309 (Vdd2).

Or, when a power voltage 303 of 1.2 V is supplied by the external power supply IC, the incorporated operational amplifier of the power voltage variable block 307 can supply 1.2 V along the power line 308 (Vdd1), and can disconnect the power line 309 (Vdd2) so as to supply 0 V.

As described above, the signal processor (DRP) of this mode can cope with two types of processes: a case wherein there is a drop in the power voltage (Vdd2 in FIG. 1) for the processor elements, and a case wherein a determination is made, for each processor element, of the portion whereat a voltage is to be dropped or is not to be dropped, or of the portion whereat a zero voltage is to be supplied.

When a circuit is to be reconfigured by mapping the algorithm for a specific signal process, an operation that requires a small amount of processing is allocated for a specific processor element 311 in the signal processor, while an operation that requires a large amount of processing and a high-speed operation is allocated for the other processor element 321. In this case, different power voltages are supplied to the individual processor elements, and a uniform high voltage (e.g., 1.2 V or 1.3 V) is not supplied, so that a reduction in power use can be provided.

Furthermore, in the above example, the power 302 has been designated as 1.5 V; however, when reconfiguration performed at a high speed is not needed (e.g., the switching speed for cell mapping is low), the power 302 need only be dropped to 1.3 V or 1.2 V, so that a reduction in power use can be provided.

In many cases, reconfiguration performed at a high speed is desired; however, when a voltage is determined in accordance with the operating speed, the power consumed by the computing units in the processor elements would be raised. Therefore, as shown in FIG. 1, the power voltage may be divided into a voltage Vdd1 and a voltage Vdd2.

The level shifter 310 or 320 in FIG. 3 corresponds to the level shifter 101a in FIG. 1 or the level shifter incorporated register 201a in FIG. 2, and the processor elements 311 and 321 in FIG. 3 correspond to the input/output register 103a or b in FIG. 1 and the computing unit 104a or b or the computing unit 204a or b in FIG. 2. Further, the level shifter 312 or 322 in FIG. 3 corresponds to the level shifter 101b in FIG. 1 or to the level shifter incorporated register 201b in FIG. 2.

Figure 4:
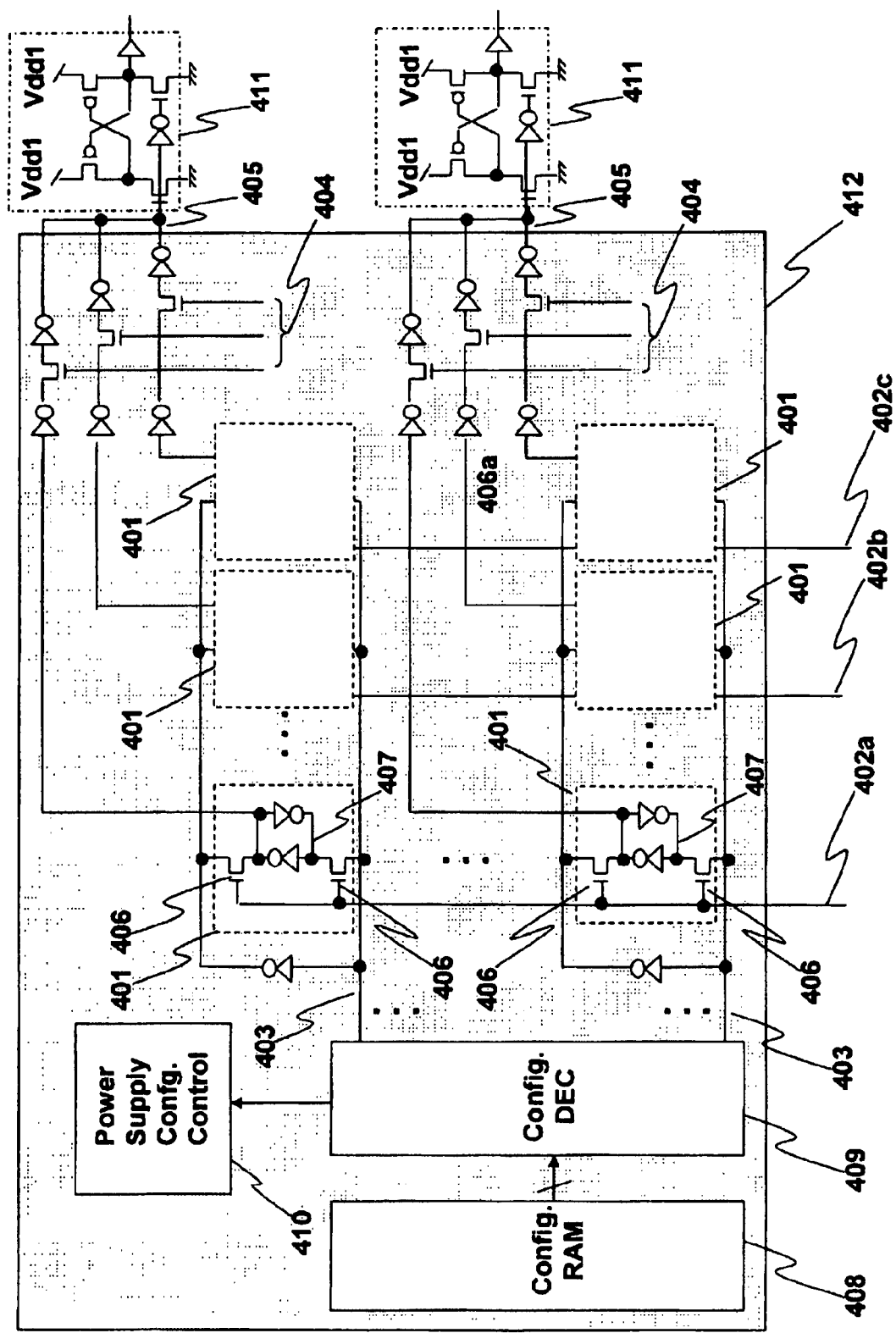
FIG. 4 is a schematic configuration diagram for the configuration control circuit of the signal processor for the mode of the present invention.

FIG. 4 is a schematic configuration diagram showing the configuration control circuit of the signal processor according to the mode of the present invention. While referring to this diagram, shown therein are: a processor element 401, configuration information hold enable signals 402a, 402b and 402c, configuration information decoded results (multiplexer control signal) 403, an output ENABLE 404 for a configuration control signal decoding results holding unit, a signal output portion 405 of the configuration control signal decoding results holding unit, a configuration control signal decoding results write control signal 406, a configuration control signal decoding results holding unit 407, a configuration software storage memory 408, a configuration control signal decoder 409, a configuration control circuit 410 of a power supply unit, and a level shifter (signal boosting unit Vdd1: high voltage side) 411.

According to the signal processor of this mode, power consumption can be lowered especially by setting an extremely low operating clock frequently for the processor elements 401.

Also the connection of the processor elements 401 is changed, and as for the circuit reconfiguration control portion that can freely change the signal process contents to be executed, reconfiguration can be performed at a high speed by setting the power voltage higher than that of the processor elements 401, without increasing the size of a transistor circuit.

Figure 5:
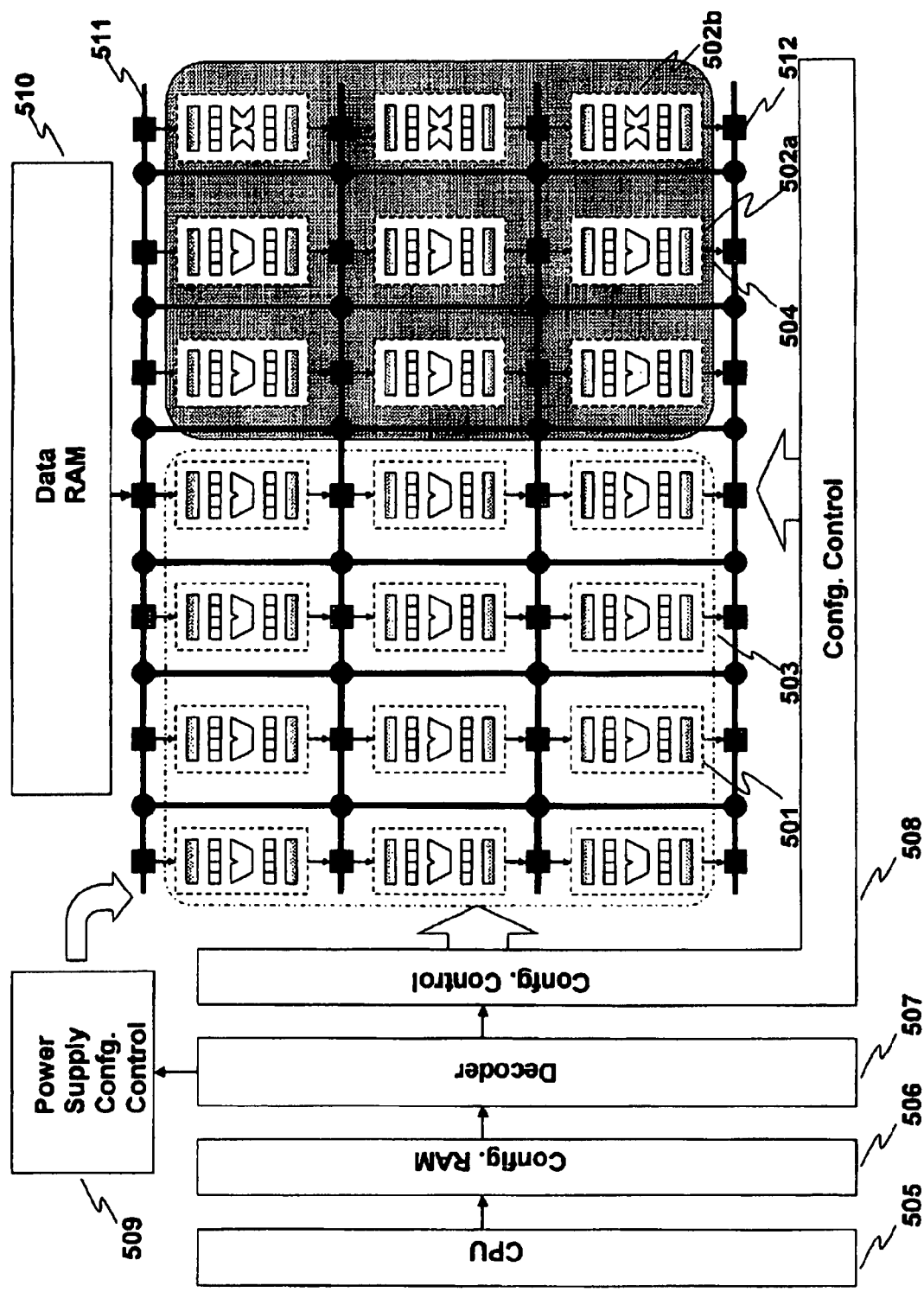
FIG. 5 is an explanatory diagram showing a first embodiment (during power supply cutoff control) for a reconfigurable signal processor according to the present invention.

FIG. 5 is an explanatory diagram for a first embodiment (during power cutoff control) for a reconfigurable signal processor according to the present invention. While referring to this diagram, shown therein are: processor elements 501, which are mapped by circuit reconfiguration; processor elements 502a and 502b, which are not mapped by circuit reconfiguration; a power voltage supply area 503; a power voltage cutoff area 504; a system control CPU 505; a configuration information storage memory 506; a configuration control signal decoder 507; a configuration control circuit 508; a configuration control circuit 509 for a power supply unit; a data memory 510; a global bus (high voltage side) 511; and a global bus switch (high voltage side) 512.

The configuration control circuit 509 for the power supply unit corresponds to 305 in FIG. 3 or 410 in FIG. 4. The configuration control circuit 508 corresponds to 315 in FIG. 3, and corresponds to the configuration control circuit 412 in FIG. 4, from which the configuration software storage memory 408, the configuration control signal decoder 409 and the configuration control circuit 410 for the power supply unit are removed.

All the components shown in FIG. 5 are included in the DRP. Further, the configuration in FIG. 5 corresponds to that in FIG. 3, except for the power supply IC 316. In addition, in FIGS. 5 and 4, the power feed lines and the reconfigured mechanism of the power supply unit are not shown. These portions are shown in FIG. 3 as the power lines 308 and 309, the power feed lines 301, 302 and 303 and the signal line 304 and the power voltage variable block 307 in FIG. 3.

The signal processor in this mode includes: a switch 512, which can select the connection of a plurality of processor elements 501, depending on the contents of a signal process to be performed; a configuration information storage memory 506, in which information for controlling circuit reconfiguration is stored; and a configuration control circuit 509, for selecting the power voltage for the processor elements, depending on information used for reconfiguration of the circuit.

Thus, the signal processor has a function for circuit reconfiguration of the individual processor elements 501, in accordance with the contents of the signal process to be performed, and a function for changing a voltage to be supplied to the individual processor elements 501.

Figure 6:
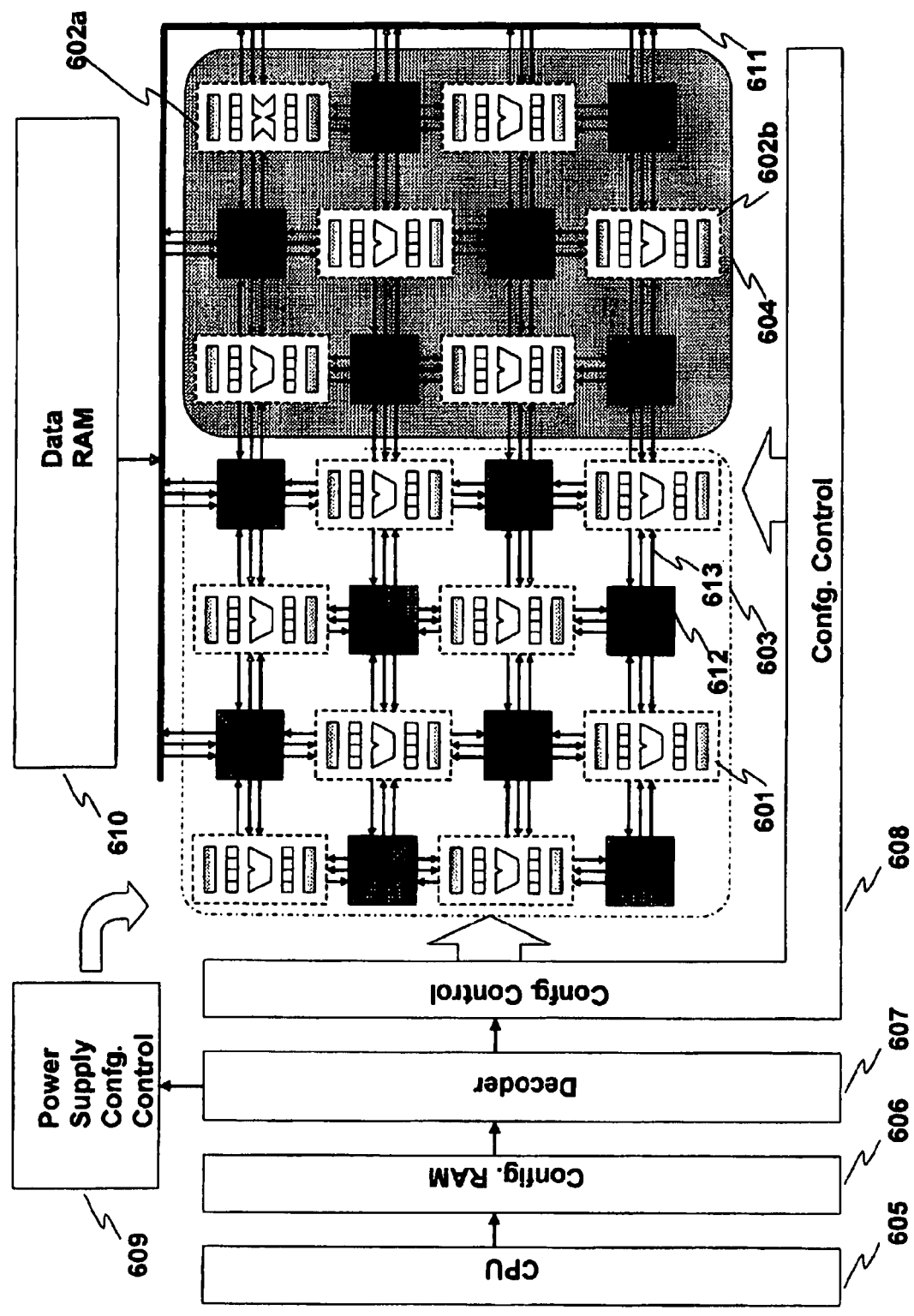
FIG. 6 is an explanatory diagram showing a second embodiment (during power supply cutoff control) for the reconfigurable signal processor according to the present invention.

FIG. 6 is an explanatory diagram for a second embodiment (during power cutoff control) for the reconfigurable signal processor according to the present invention. While referring to this diagram, shown are: processor elements 601, which are mapped by circuit reconfiguration: processor elements 602a and 602b, which are not mapped by circuit reconfiguration; a power voltage supply area 603; a power voltage cutoff area 604; a system control CPU 605; a configuration information storage memory 606; a configuration control signal decoder 607; a configuration control circuit 608; a configuration control circuit 609 for a power supply unit; a data memory 610; a global bus 611; a local bus switch (selector) 612; and a local bus 613.

According to the signal processor of this mode, for the processor elements 602a and 602b that are not used for a signal process to be performed, i.e., for the processor elements 602a and 602b that were not mapped when connection of processor elements were changed in accordance with control information used for circuit reconfiguration, the power voltage is dropped considerably. Thus, the occurrence of an off-leak current in a computing unit that is not being used in the current signal process can be suppressed.

For example, when the layout of an LSI is designed, the global bus 611 can connect arbitrary processor elements, and reconfiguration with a high degree of freedom is enabled. On the other hand, the local bus 613 must connect processor elements arranged near each other, and the degree of freedom available for the combination of processor elements (computing units) is lowered. It should be noted, however, that the local bus 613 is employed to connect, for example, adjacent 8-bit ALUs to constitute a 16-bit ALU. In this case, the global bus 611 is also available; however, a great load would be imposed on the switch portion, and the size of the circuit would be increased.

Furthermore, the local bus 613 is prepared as a specialized function for constituting a loop operation unit, a combinational operating unit, or an ALU-MUL, Sift-ALU or ACS (Add-Compare-Select) computing unit by combining the upper and lower cells.

Figure 7:
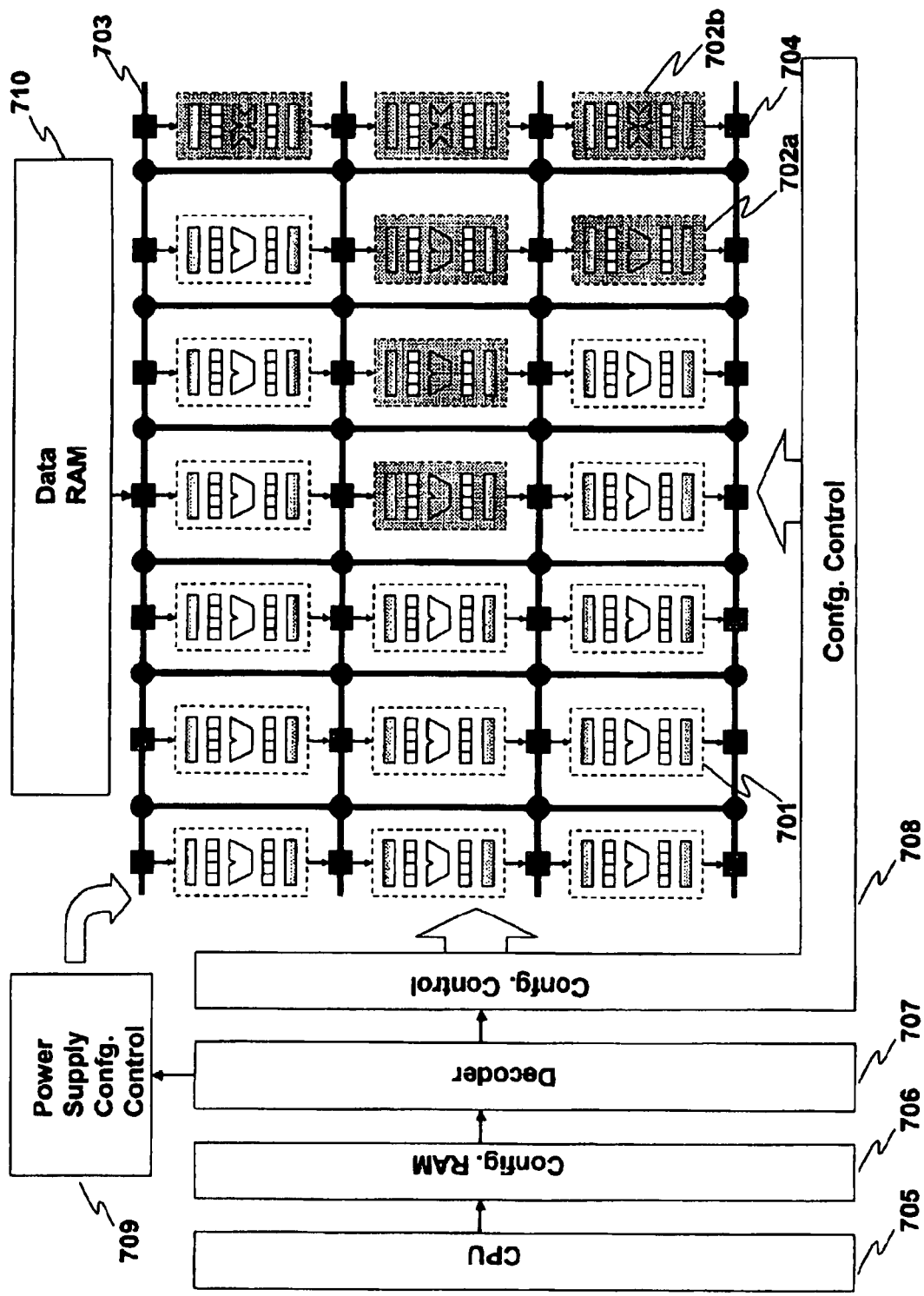
FIG. 7 is an explanatory diagram showing a third embodiment (during voltage control) for the reconfigurable signal processor according to the present invention.

FIG. 7 is an explanatory diagram of a third embodiment (during voltage control) for the reconfigurable signal processor according to the present invention. While referring to this diagram, shown therein are: processor elements (operation-enabled power voltage supply areas) 701, which are mapped by circuit reconfiguration; processor elements (standby power voltage supply areas) 702a and 702b, which are not mapped by circuit reconfiguration; a system control CPU 705; a configuration information storage memory 706; a configuration control signal decoder 707; a configuration control circuit 708; a configuration control circuit 709 for a power supply unit; a data memory 710; a bus 703; and a switch 704.

According to the signal processor of this mode, for the processor elements 702a and 702b that are not used for a signal process to be performed, i.e., for the processor elements 702a and 702b that were not mapped when the connection of the computing units were changed in accordance with control information used for circuit reconfiguration, the supply of the power voltage is cutoff. Thus, the occurrence of an off-leak in the computing unit that is not being used for the current signal processing can be suppressed.

Figure 8:
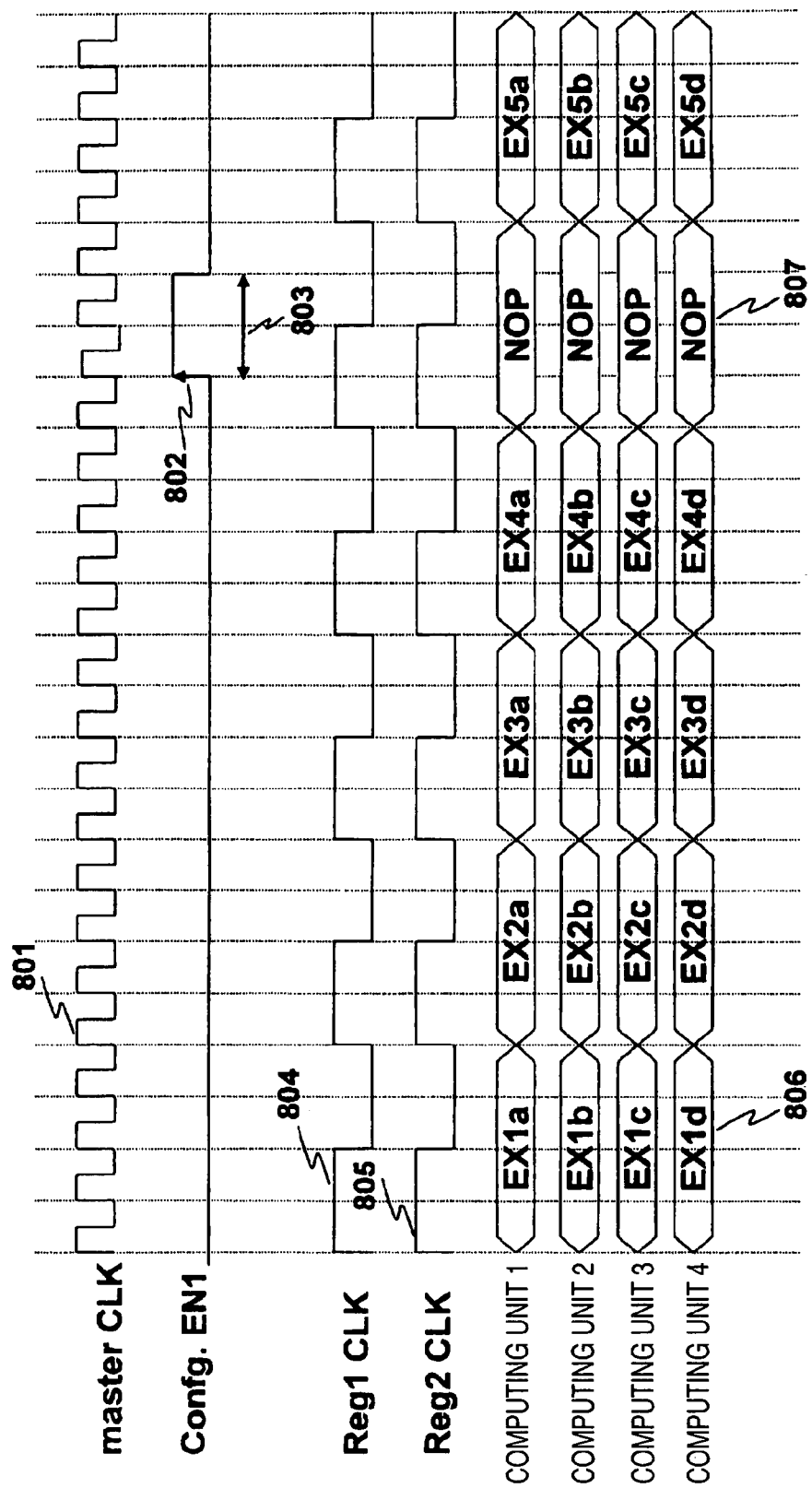
FIG. 8 is a timing chart for circuit reconfiguration control in a sequential operating mode performed by the signal processor according to the mode.

FIG. 8 is a timing chart for circuit reconfiguration control in a sequential operating mode of the signal processor according to this mode. While referring to the diagram, shown therein are: a master clock 801 in the sequential operating mode; a configuration ENABLE 802 in the sequential operating mode; a circuit reconfiguration period 803 in the sequential operating mode; an input register clock signal 804 in the sequential operating mode; an output register clock signal 805 in the sequential operating mode; a signal processing execution stage (operation stage) 806 in the sequential operating mode; and a signal processing halt stage (No Operation execution) 807 in the sequential operating mode. In this case, the sequential operating mode is a mode in which, for example, a processor element performs an operation each cycle.

The configuration ENABLE 802 in the sequential operating mode corresponds to the output ENABLE 404 of the configuration control signal decoding results holding unit in FIG. 4, and corresponds to an enable control signal 1010, 1011, 1012 or 1013 in FIG. 10, which will be described later.

In FIG. 8, EX1$a$, EX1$b$, etc. 806, represent execution stages, during which specific computing units (specific processor elements in a DRP) execute corresponding instructions (EX1$a$, EX1$b$, etc.). For example, when EX1$a$, EX1$b$, etc., are multiplication instructions, the switch 704 is switched to a processor element that can perform multiplication, and data is transmitted by the data bus 703 to the processor element that can perform the multiplication. Further, when EX2$a$, EX2$b$, etc., are addition instructions, a processor element having an addition function is connected to perform addition.

On the other hand, the NOP 807 represents a NoOperation, which is an instruction (or a stage) by which any operation is to be performed. Since the NOP 807 is a stage during which no instruction is issued, a period during which switching is performed within this idle time is the period 803 during which the configuration ENABLE 802 is active.

The master clock 801, the configuration ENABLE 802, the input register clock signal 804 and the output register clock signal 805 are transmitted by the configuration control circuits 608 and 708. Information that corresponds to these instructions is stored in the configuration information storage memories 606 and 706, and is decoded by the configuration control signal decoders 607 and 707.

The master clock 801 is a clock to be supplied to the configuration information storage memories 606 and 706, the configuration control signal decoders 607 and 707 and the configuration control circuits 607 and 708. The configuration ENABLE 802 is prepared based on the decoded results obtained by the configuration control signal decoders 607 and 707, and is employed by, and output by the configuration control circuits 608 and 708. Further, the register clocks 804 and 805 are generated by the configuration control circuits 608 and 708 in accordance with signals that are obtained by decoding instructions based on the master clock 801.

Figure 9:
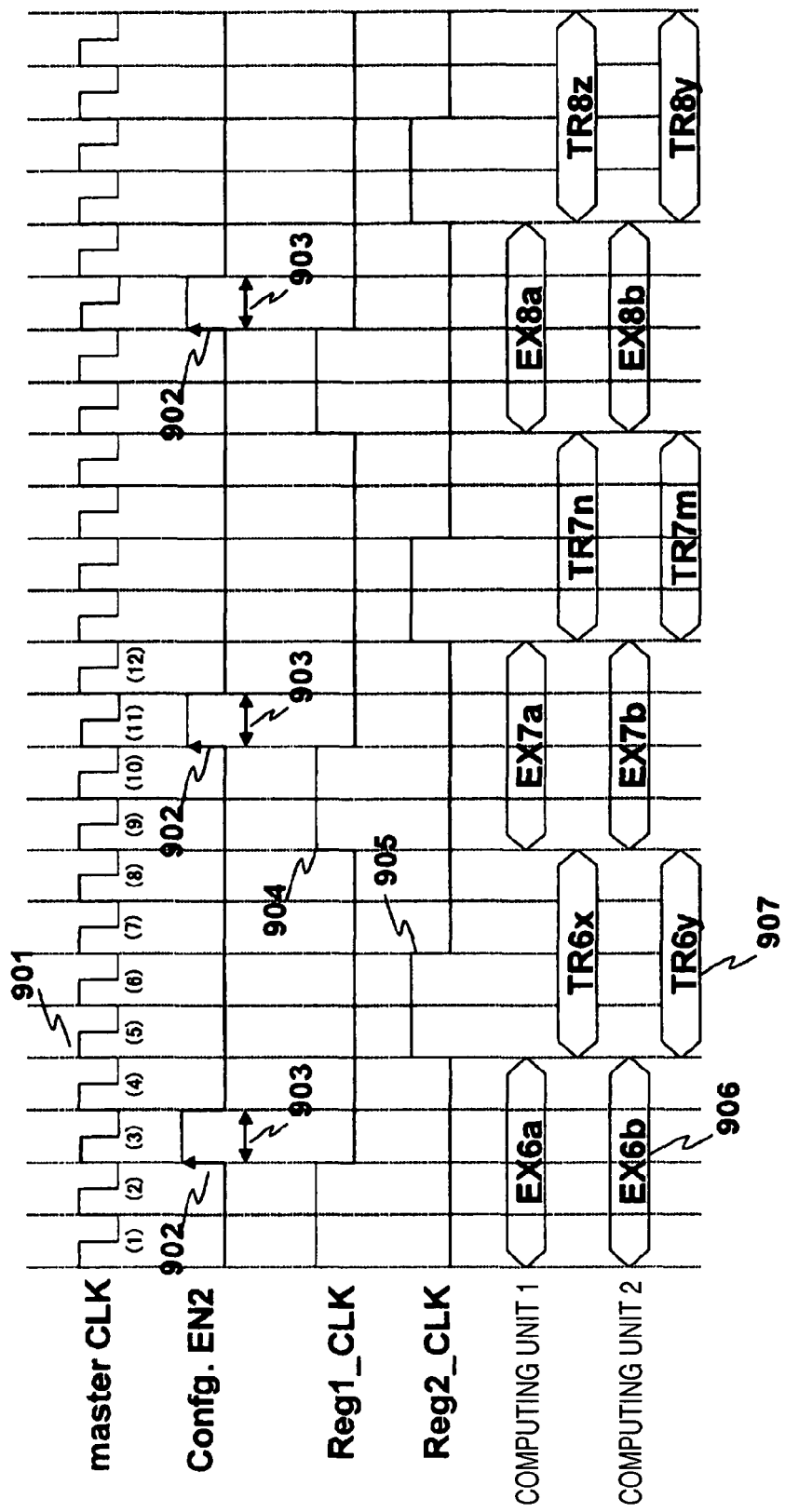
FIG. 9 is a timing chart for circuit reconfiguration control in an alternate operating mode performed by the signal processor according to the mode.

FIG. 9 is a timing chart for the circuit reconfiguration control in an alternate operating mode for the signal processor according to this mode. While referring to this diagram, shown therein are: a master clock 901 in the alternate mode (time-sharing mapping mode); a configuration ENABLE 902 in the alternate mode (time-sharing mapping mode); a circuit reconfiguration period 903 in the alternate mode (time-sharing mapping mode); an input register clock signal 904 in the alternate mode (time-sharing mapping mode); an output register clock signal 905 in the alternate mode (time-sharing mapping mode); a signal process execution stage (operating stage) 906 in the alternate mode (time-sharing mapping mode); and a data transfer stage 907 in the alternate mode (time-sharing mapping mode).

In FIG. 9, the portions between (3) and (4), between (7) and (8), and between (9) and (10) (hereinafter not shown) in a clock cycle are the above described idle portions. That is, a period other than an EX 906 (a period during which a processor element performs computation) and a TR 907 (a data transfer period, from a data RAM or a processor element to a processor or a next processor element), is a period available for switching.

During this period, the configuration ENABLE 902 is rendered active, and switching (reconfiguration/reconnection) is performed. In this case, the most adequate internal delay time is obtained when switching is synchronized with the trailing edge of the register clock 904.

The configuration ENABLE 902 is a switching (reconfiguration/reconnection) enable signal. In the alternate operating mode in FIG. 9, the EX (computation) period and the TR (transfer) period alternately appear, and since the bus portion is also to be reconfigured for reconfiguration/reconnection, switching is not performed during the TR period. Therefore, in the alternate operating mode, the EX (computation) period is employed to perform switching.

As described above, according to the signal processor of this mode, in the sequential operating mode (first operating mode), in accordance with the signal process contents, reconfiguration is performed for the input register and the output register that are arranged in the data input and data output portions of the processor elements, and a digital signal process, such as a computation process, is sequentially performed by the processor elements. Further, in the alternate operating mode (second operating mode), a digital signal process, such as a computation, and a process for transferring data from the output register to the input register are alternately performed, and during a period in which the processor element performs the digital signal process, the circuit reconfiguration operation for changing the connection of the processor elements is performed. Thus, the efficiency of the usage of the processor elements is improved, and the power to be consumed is lowered.

It should be noted that, when either the input register or the output register is arranged, the computation process, etc., can also be sequentially performed by the processor elements. For example, unless the computation results obtained by a specific processor element are first received by a register, the results are transmitted directly to the next processor element. And when computation data are transmitted endlessly, either the switching of the bus, or the reconfiguration is disabled. Further, since synchronization with a clock signal is required, a register should be located at the input or the output portion. When a register is arranged both at the input and the output portions, the EX (computation) stage and the TR (transfer) stage can be prepared.

When a large number of signals are to be processed during a unit hour, the first mode (a high-speed operating mode or a high throughput mode) is designated. On the other hand, the second mode is a lower power mode than is the first mode.

Power for the processor element is represented by $C \times f \times Vdd^2$, wherein a capacitance is C, a clock frequency is f and a power voltage is Vdd. The register clock 804 in FIG. 8 is input at half the frequency of the master clock 801, while the register clock 904 in FIG. 9 is equivalent to the register clock 804 in FIG. 8 that is intermittently input. For example, when the frequency of the master clock 801 is 100 MHz, the frequency of the register clock 804 in FIG. 8 is 50 MHz and the frequency of the register clock 904 in FIG. 9 corresponds to 25 MHz. As the frequency f in the above expression is reduced, power usage can be reduced.

As described above, according to the signal processor of this mode, since the registers are provided on the input side and the output side of the process or elements, the connection of the processor elements can be changed during a period wherein the digital signal process is performed by the processor elements.

That is, the connection of the bus is changed during a period (computation period) in which the input register outputs a signal, the processor elements perform computation, and a signal is transmitted to the output register. On the other hand, the processor elements do not perform any computation operation during a period in which the output register transfers a signal through the bus to the input register (a period during which reconfiguration is disabled). Thus, power consumption is low.

Furthermore, according to the signal processor of this mode, information for scheduling is stored in the configuration information storage memory in the order corresponding to the time at which to perform the contents off signal processes.

Thus, when the contents of signal processes to be performed are mapped to the reconfigurable signal processor, and when all the processes can not be mapped, the contents of the signal processes can be scheduled in accordance with the performance time order, and can be mapped in a time-sharing manner using the second operating mode.

Figure 10:
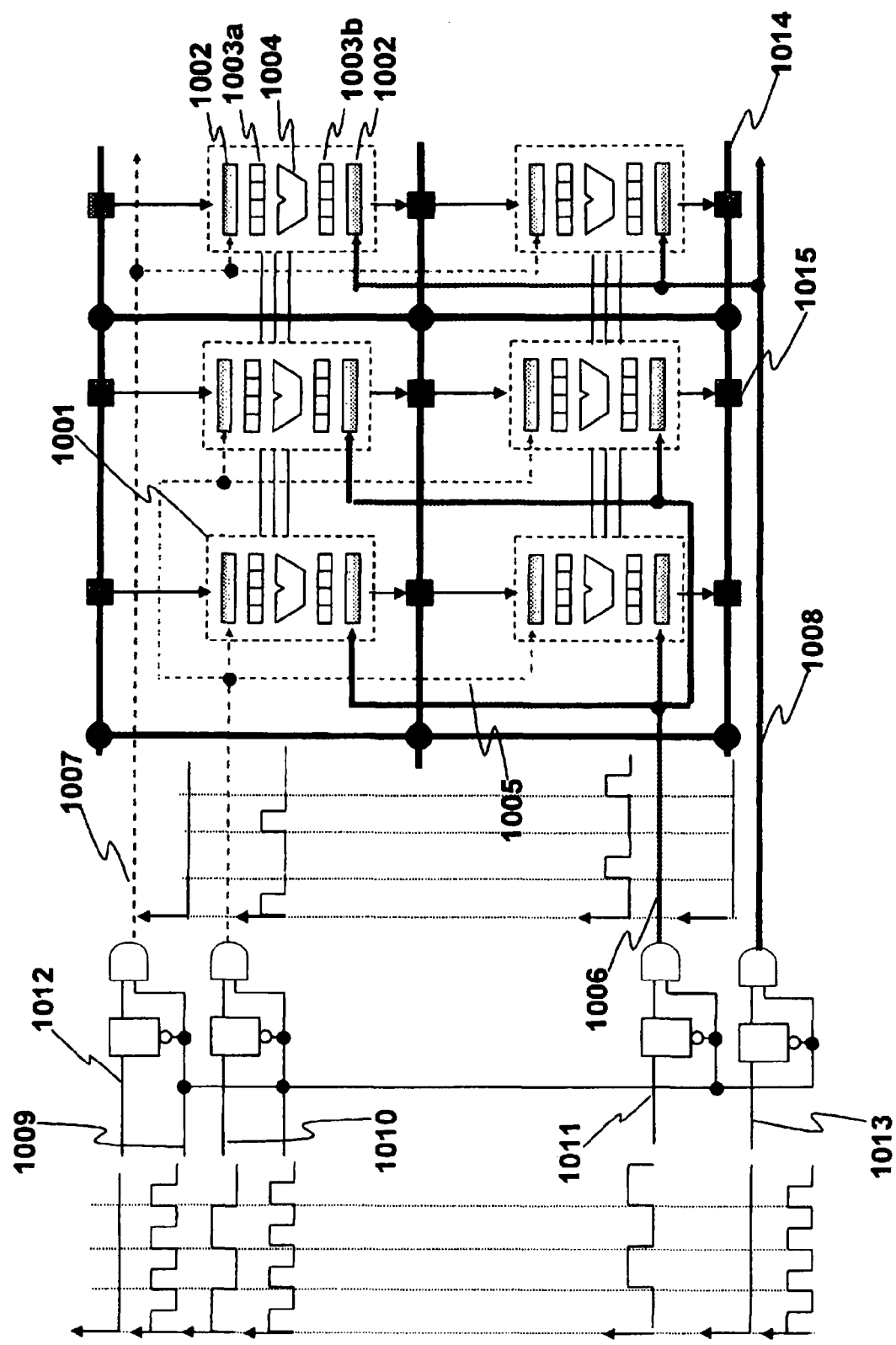
FIG. 10 is an explanatory diagram showing a clock control circuit in the alternate operating mode of the signal processor according to the mode.

FIG. 10 is an explanatory diagram for the clock control circuit for the alternate operating mode of the signal processor according to the mode. While referring to this diagram, shown therein are: processor elements 1001; a level shifter 1002; an input register 1003a; an output register 1003b; a computing unit 1004; a clock signal (a portion to which a clock is supplied in the alternate mode) 1005 of an output register; a clock signal (an unmapped processor element) 1007 of an input register; a clock signal (an unmapped processor element) 1008 of an output register; a master clock 1009; an input register enable control signal 1010, in the alternate mode and during mapping; an output register enable control signal 1011 in the alternate mode and during mapping; an input register enable control signal 1012, in the alternate mode and while not mapping; an output register enable control signal 1013, in the alternate mode and while not mapping; a bus 1014; and a switch 1015.

The circuit shown in FIG. 10 is one part of the internal circuit of the configuration control circuit 708, and enable control signals 1012, 1010, 1011 and 1013 are transmitted, for example, by the configuration control decoder 707. The enable control signal 1010 is used to determine a period during which the input portions of the processor elements are active, and the enable control signal 1011 are used to determine a period during which the output portions of the processor elements are active. These signals are output in synchronization with the master clock 1009.

The processor elements shown in the upper level in FIG. 10 receive data from the bus and perform computation (EX) during a period indicated by the clock signal 1005, which is formed by the enable control signal 1010. On the other hand, during a period of the clock signal 1006 formed by the enable control signal 1011, data transfer (TR) is performed by the processor elements shown in the upper level in FIG. 10 to the processor elements shown in the lower level.

Figure 11:
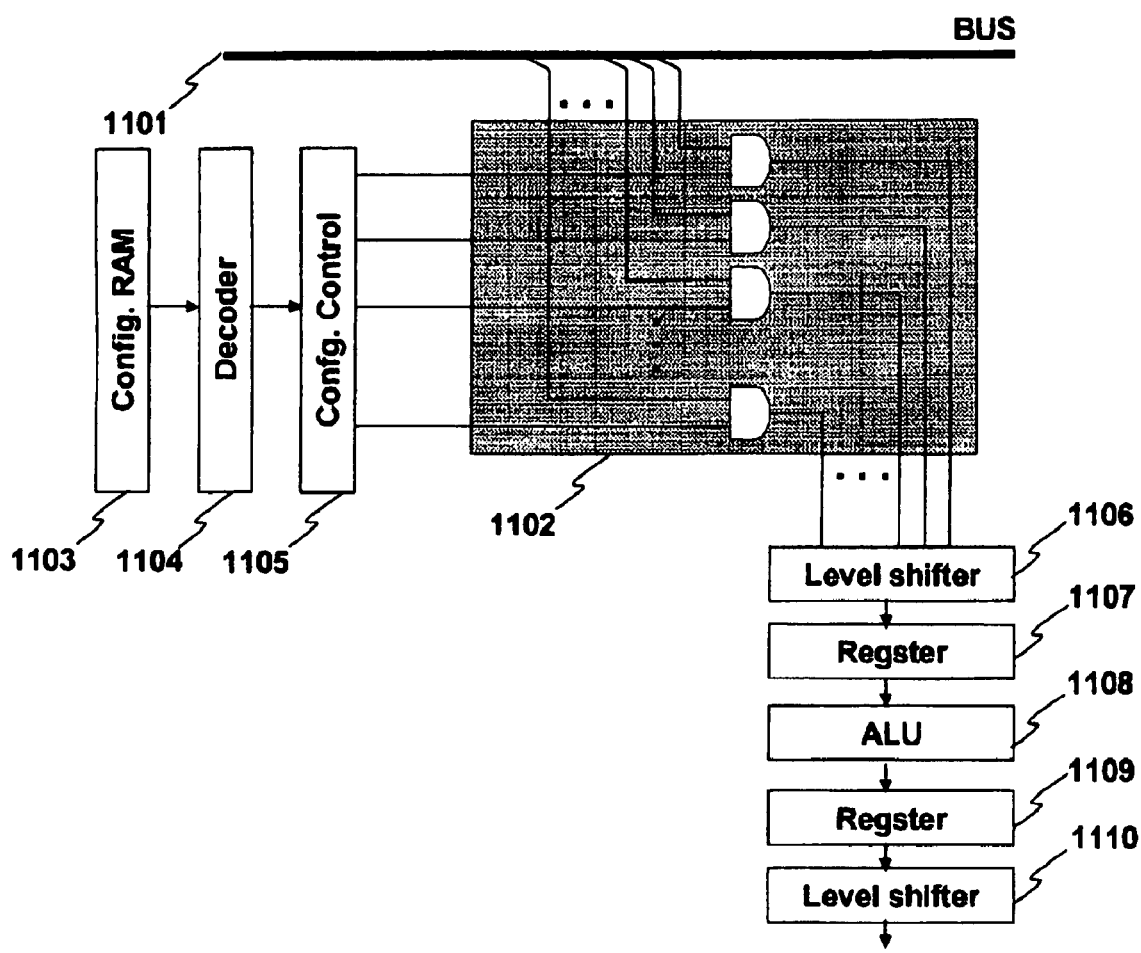
FIG. 11 is an explanatory diagram for the bus and the switch unit of the signal processor according to the mode.

FIG. 11 is an explanatory diagram for the bus and the switch unit of the signal processor according to the mode. While referring to this diagram, shown therein are: a bus 1101; a switch unit 1102; a configuration information storage memory 1103; a configuration information decoder 1104; a configuration control circuit 1105; a level shifter 1106; an input register 1107; a computing unit 1108; an output register 1109; and a level shifter 1110.

The switch unit 1102 corresponds to 512 in FIG. 5, 612 in FIG. 6 or 704 in FIG. 7. The configuration control circuit 1105 generates a configuration enable signal (reconfiguration control signal) to determine whether data on the bus 1102 should be transmitted to the input register 1107, the computing unit 1108 and the output register 1109 to perform computation. Therefore, when a configuration enable signal is active, the path from the bus 1101 to the switch unit 1102, the input register 1107, the computing unit 1108 and the output register 1109 is formed, and computation is performed.

For example, six processor elements are shown in FIG. 10, and the switch unit 1102 determines the next transmission destination of the computation results that are obtained by the processor element at the upper right end, and the processor element that should perform the next computation.

The switch unit 1102 is provided at the entrance of each processor element, and the configuration control circuit 1105 instructs whether data on the bus 1101 should be fetched and computation should be performed. When the configuration enable signal output by the configuration control circuit 1105 is not active, the signal along the bus 1105 is not transmitted to the switch unit 1102, the input register 1107, the computing unit 1108 and the output register 1109. Therefore, the pertinent processor element is not an object for reconfiguration.

Figure 12:
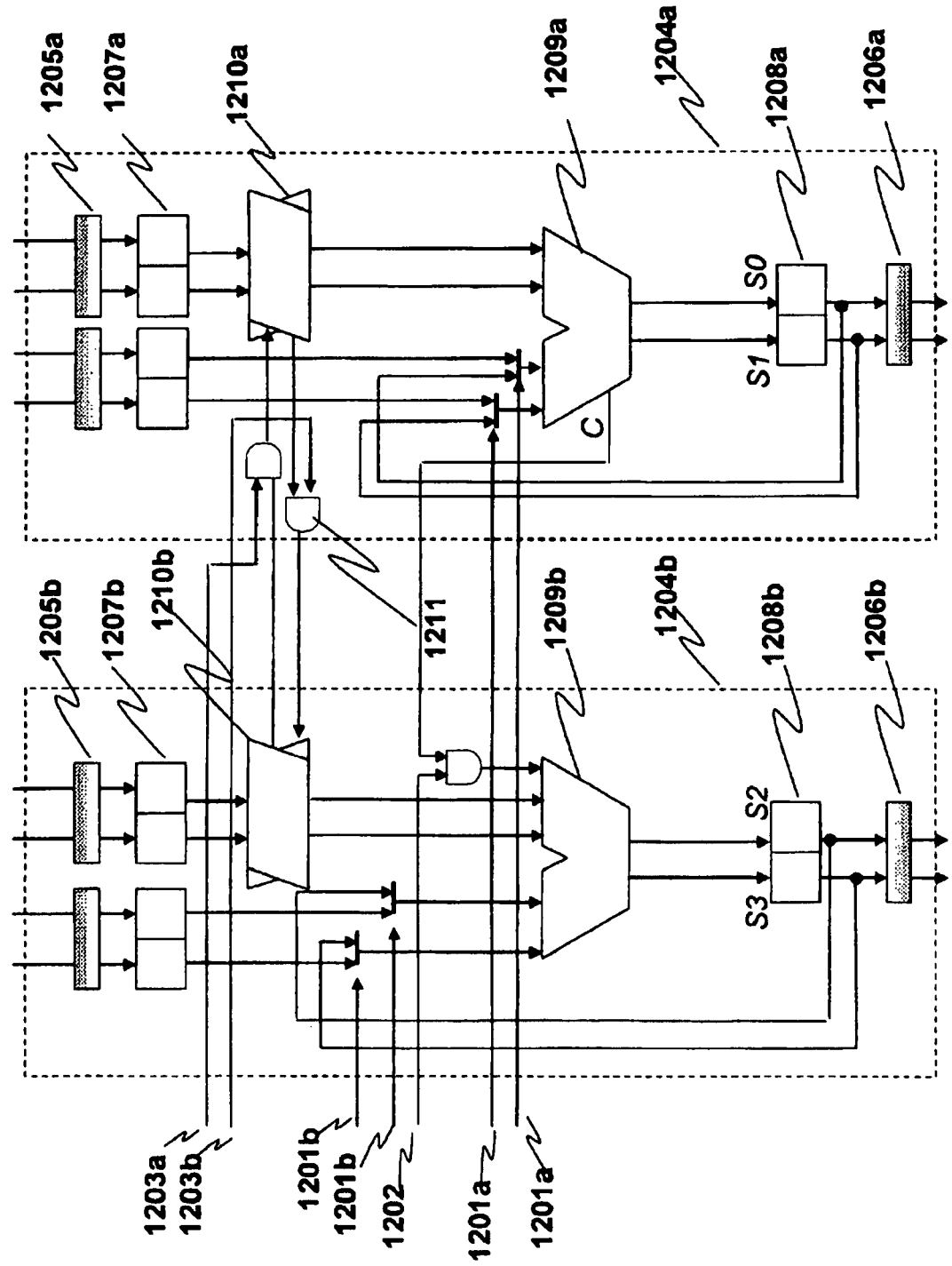
FIG. 12 is an explanatory diagram showing an embodiment related to a local circuit reconfiguration performed by the signal processor according to the mode.
Figure 13:
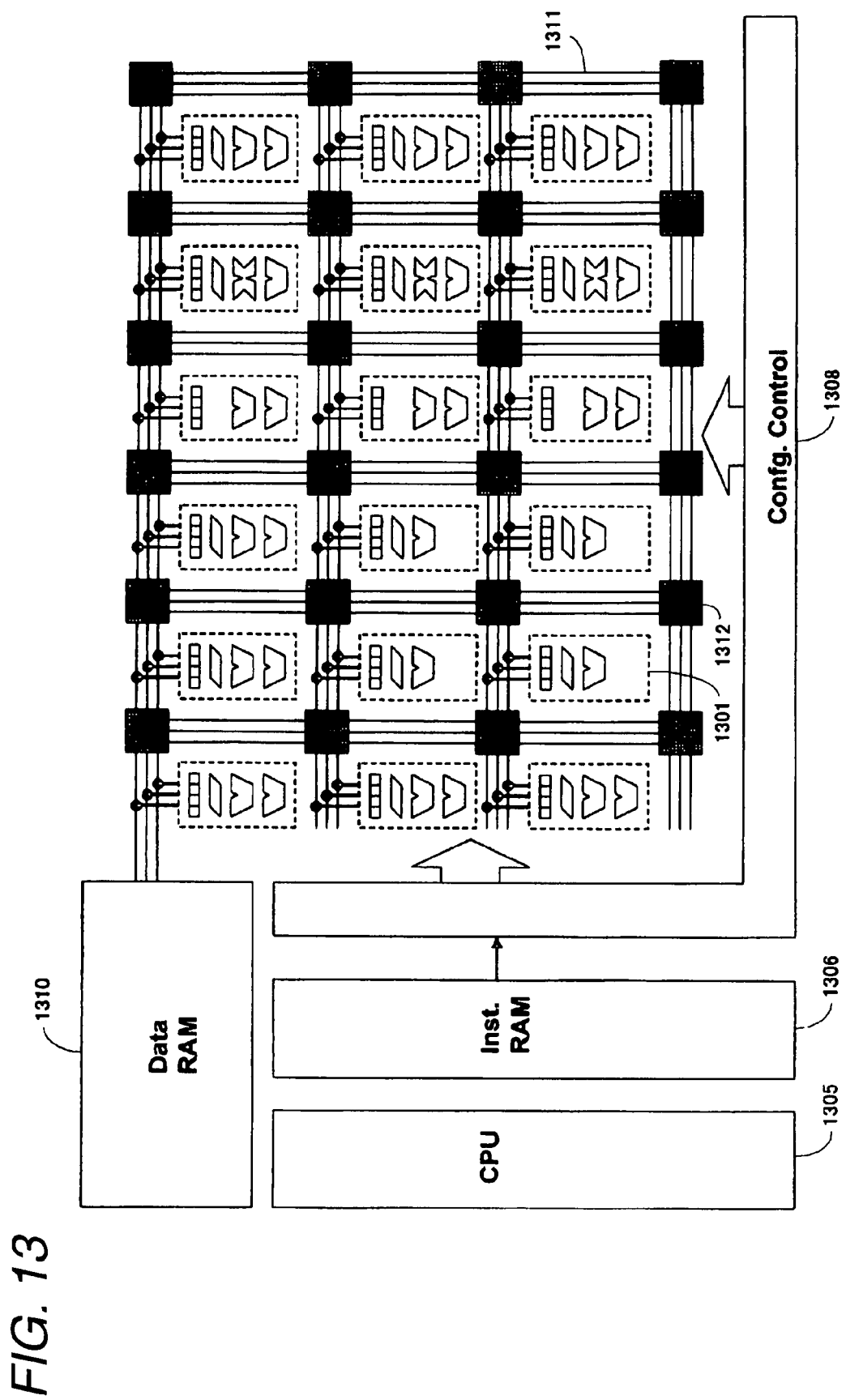
FIG. 13 is an explanatory diagram for a conventional reconfigurable processor.
Figure 14:
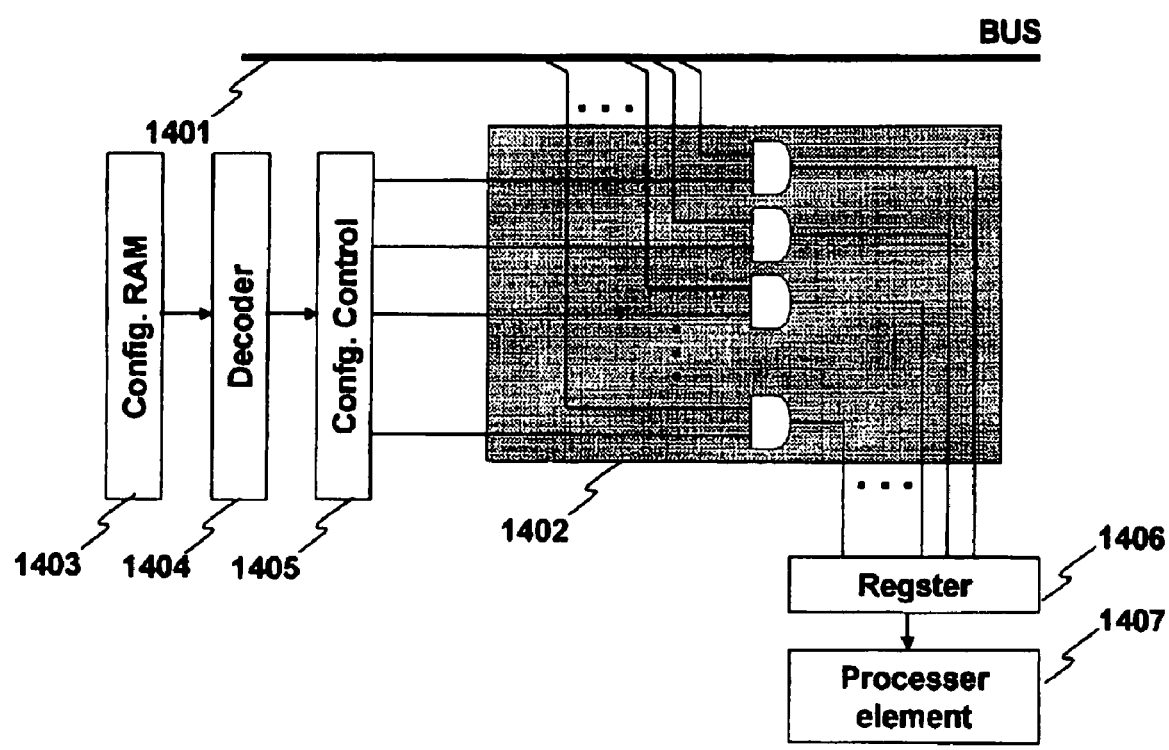
FIG. 14 is an explanatory diagram for the bus and the switch unit of a conventional example that does not include a power supply reconfiguration function.

FIG. 12 is an explanatory diagram for an embodiment related to a local circuit reconfiguration for the signal processor according to the mode. While referring to this diagram, shown therein are: loop operation configuration enable signals 1201a and 1201b; a multi-operation configuration enable signal 1202; a right shift extension signal 1203a; a left shift extension signal 1203b; a processor element 1204a, arranged in an even-numbered column; a processor element 1204b, arranged in an odd-numbered column; level shifters 1205a and 1205b; level shifters 1206a and 1206b; input registers 1207a and 1207b; output registers 1208a and 1208b; computing units (ALUs, multipliers, etc.) 1209a and 1209b; shift computing units (barrel shifters, etc.) 1210a and 1210b; and shift computing unit extension circuit 1211.

When the processor element 1204a, arranged in the even numbered column, and the processor element 1204b, arranged in the odd-numbered column, are 4-bit ALUs, these two can be reconfigured transversely to serve as an 8-bit ALU. Therefore, the processor elements 1204a and 1204b differ from each other in that bit extension signals are for lower bits and for upper bits. For example, the processor element 1209b receives a carry signal from the ALU (Arithmetic and Logic Unit) of the processor element 1209a.

The loop operation configuration enable signal 1201a, etc., is a control signal for performing reconfiguration using a small number of the resources (units) of the computing units.

That is, in a case wherein the computing unit 1209b and the ALU of the computing unit 1209b perform addition repetitively five times, for example, five processor units are not employed to reconfigure a serial connection, instead, one processor element is employed to perform addition five times.

When this signal is not present to sequentially perform addition five times, five processor elements to perform addition should be mapped, in series, to perform computation. Furthermore, when the reconfiguration function is employed, only one processor element is sufficient for performing computation, but since data must be looped via the external bus, the efficiency with which the bus is used may be degraded.

In order to increase the degree of freedom in the usage of the bus, it is preferable that the global bus be used as little as possible.

Therefore, as in this mode, when the loop operation configuration enable signals 1201a and 1201b are employed, the loop operation can be performed by using only one processor element. Further, since the processor element can be independently used internally, without having to use an external global bus, a reduction in the efficiency of the bus usage can be suppressed.

The multi-operation configuration enable signal 1202 is a bit extension function signal. For example, when the processor elements 1209a and 1209b are 4-bit ALUs, the two elements can serve as an 8-bit ALU by using the multi-operation configuration enable signal 1202. When bit extension is performed by employing the multi-operation configuration enable signal 1202, the C signal is transmitted by the processor element 1209a, and the processor element 1209b serves as a processor element for the upper bits.

Supposing that the shift computing units 1210a and 1210b are 4-bit shifters, when the right shift extension signal 1203a and the left shift extension signal 1203b are rendered OFF, the shift computing units 1210a and 1210b serve as separate 4-bit shifters. Whereas when the right shift extension signal 1203a is rendered ON, the shift computing units 1210a and 1210b serve as an 8-bit shifter for a right shift. And when the left shift extension signal 1203b is rendered ON, the shift computing units 1210a and 1210b serve as an 8-bit shifter for a left shift.

The loop operation configuration enable signals 1201a and 1201b, the multi-operation configuration enable signal 1202, the right shift extension signal 1203a and the left shift extension signal 1203b are transmitted by the configuration control circuits 1105, 708 and 608.

For example, when a "1" is entered in the loop operation configuration enable signal 1201a, the left arrow of a selector is selected, signals S0 and S1 are transmitted to the computing unit 1209a, and the LOOP operation is performed.

Further, when a "0" is entered in the loop operation configuration enable signal 1201a, the right arrow input of a selector is selected, register information for the input register 1209a is transmitted to the computing unit 1209a, and a normal path is formed.

According to the signal processor of this mode, such a case is detected wherein a combinational computation, such as a repetitive computation or multiply accumulation, or a double-precision computation, which is required for the bit width of the computing unit of a processor element, is included in circuit reconfiguration information provided by software.

And since processor elements located near each other are connected by a loop, in series or in parallel, the size of the circuit, which includes the bus connection of processor elements, can be reduced.

In FIG. 5 or 7, arbitrary sets of processor elements can be connected globally. However, when the connection of all the sets is available, the bus lines and the switch portion are increased, and a tradeoff involving the circuit size and the power consumption would occur. The signal processor of this mode can resolve this problem.

Figure 15:
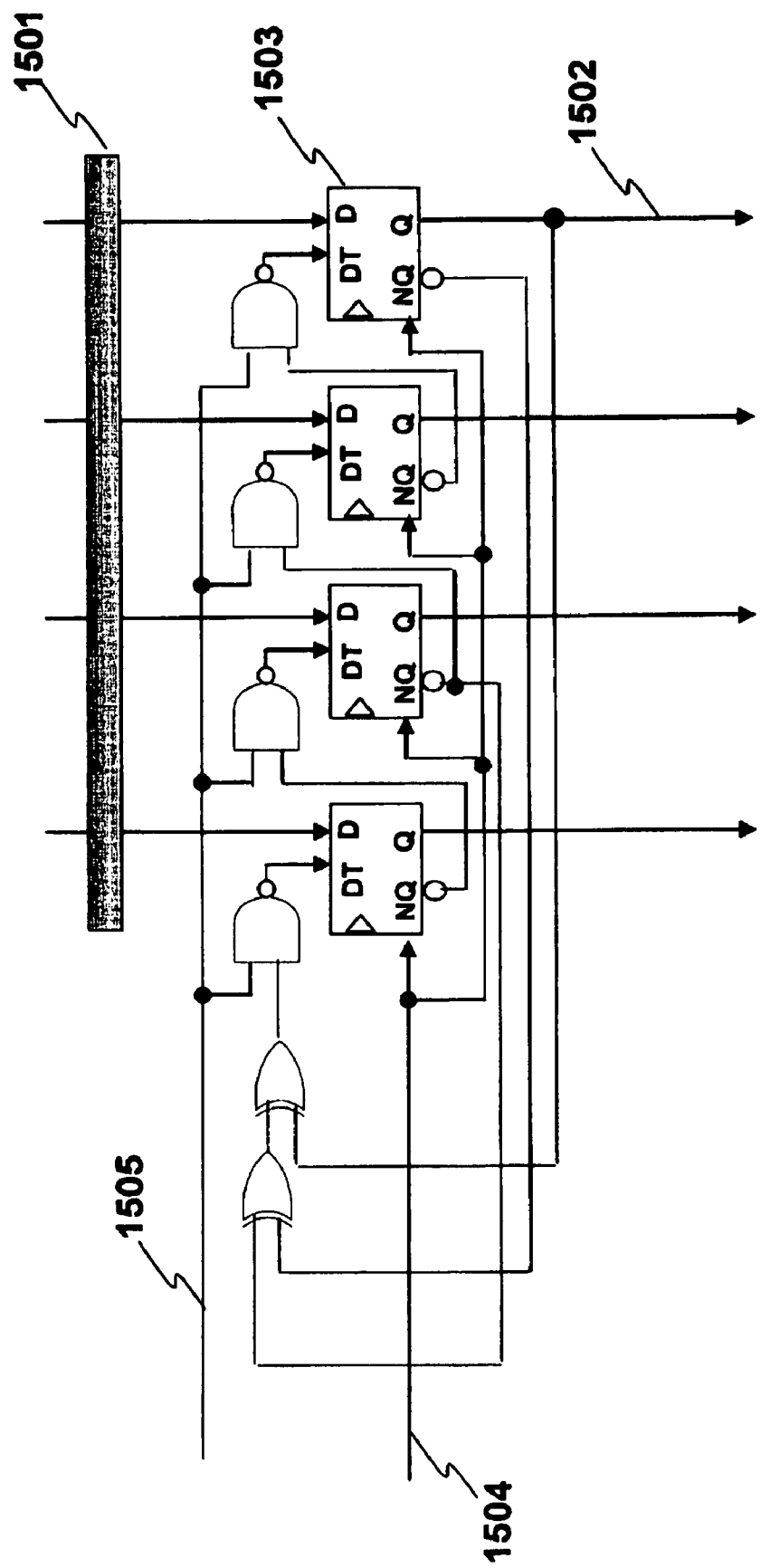
FIG. 15 is an explanatory diagram for the signal processor for the mode wherein an input register is to be reconfigured using a self-test circuit.

FIG. 15 is an explanatory diagram for a case for the signal processor of this mode wherein an input register is to be reconfigured to a self-test circuit. While referring to this diagram, shown therein are: a level shifter 1501; an output 1502, to a computing unit; an input register (a flip-flop having a scan test function) 1503; a test mode signal (configuration control signal) 1504; and a reset signal 1505 in a test mode.

IN order to provide the test function for the signal processor of the mode, the input side register is structured by using the circuit shown in FIG. 15. In accordance with the circuit reconfiguration, when the input side register is changed to a linear feedback register circuit, a pseudo random signal is transmitted to a processor element (computing unit).

On the other hand, the output side register of the processor element is reconfigured in the same manner to provide an MISR (Multiple Input Signature Register). Then, random input data is transmitted to the MISR via the processor element. Since the MISR is a compressor, the compressed random data are compared, multiple times, with an expected value external to the DRP, so that the scan test for the LSI can be conducted. In the same manner, the scan test for the bus can be performed.

INDUSTRIAL APPLICABILITY

The signal processor of the present invention can provide specific effects, such as that an increase in the speed of the configuration circuit can be achieved without an increase in the size of the circuit, and can be useful as a reconfigurable signal processor, etc.

The invention claimed is:

1. A signal processor comprising:
   a plurality of processor elements, each including a computing unit, an input register disposed at an input portion of the computing unit and an output register disposed at an output portion of the computing unit;
   a bus, for connecting the plurality of processor elements;
   a switch unit, for changing a connection for the bus;
   a control circuit, for controlling the switch unit in accordance with software; and
   a memory, for storing scheduling information relating to an order to perform signal processes by the processor elements,
   wherein the signal processor is configured to operate in:
      a first operating mode, during which the processor elements sequentially perform signal processes; and
      a second operating mode, during which signal processes performed by the processor elements and a data transfer process from the output registers of the processor elements to the input registers are alternately performed, and connections for the plurality of processor elements are changed during a period in which the processor elements perform the signal processes, and
   the control circuit performs circuit reconfiguration in a time-sharing manner in accordance with the scheduling information.

* * * * *